(12) United States Patent
Mark et al.

(10) Patent No.: US 11,794,916 B2
(45) Date of Patent: *Oct. 24, 2023

(54) CONTROL SYSTEMS FOR HYBRID ELECTRIC POWER PLANTS

(71) Applicant: Pratt & Whitney Canada Corp., Longueuil (CA)

(72) Inventors: Michael Mark, Montreal (CA); Paul C. Imel, Hartford, CT (US); Leonid Guerchkovitch, Dollard des Ormeaux (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 453 days.

This patent is subject to a terminal disclaimer.

(21) Appl. No.: 16/875,941

(22) Filed: May 15, 2020

(65) Prior Publication Data

US 2021/0354840 A1    Nov. 18, 2021

(51) Int. Cl.
*B64D 31/00*    (2006.01)
*B64D 27/02*    (2006.01)
(Continued)

(52) U.S. Cl.
CPC ............. *B64D 31/00* (2013.01); *B64D 27/02* (2013.01); *B64D 27/24* (2013.01); *B64D 43/00* (2013.01);
(Continued)

(58) Field of Classification Search
CPC .................... B64D 31/00; B64D 2027/026
See application file for complete search history.

(56) References Cited

U.S. PATENT DOCUMENTS

2016/0236790 A1* 8/2016 Knapp .................. G01C 21/20
2016/0280386 A1* 9/2016 Mestler ................. B64D 31/06
(Continued)

FOREIGN PATENT DOCUMENTS

| EP | 3613674 A1 | 2/2020 |
| WO | 2016/154556 A1 | 9/2016 |
| WO | 2020219111 A1 | 10/2020 |

OTHER PUBLICATIONS

Extended European Search Report issued during prosecution of corresponding European Patent Application No. 21174163.2 dated Oct. 13, 2021. (7 pages).

(Continued)

*Primary Examiner* — Philip J Bonzell
*Assistant Examiner* — Justin Michael Heston
(74) *Attorney, Agent, or Firm* — Norton Rose Fulbright Canada LLP

(57) ABSTRACT

A control system for a hybrid electric powerplant of an aircraft can include a throttle controller configured to receive one or more power settings and to output a heat engine setting and an electric motor setting, a heat engine controller operatively connected to the throttle controller. The heat engine controller can be configured to receive the heat engine setting and to control a heat engine system as a function of the heat engine setting to control torque output by a heat engine. The system can include a heat engine protection module that is part of or connected to the heat engine controller and configured to provide one or more protection commands to directly control one or more heat engine protection systems. The system can include an electric motor controller operatively connected to the throttle controller. The electric motor controller can be configured to receive the electric motor engine setting and to control an electric motor system as a function of the electric motor setting to control torque output by an electric motor. The (Continued)

system can include an electric motor protection module that is part of or connected to the electric motor controller and configured to provide one or more protection commands to directly control one or more electric motor protection systems.

15 Claims, 2 Drawing Sheets

(51) Int. Cl.
*B64D 27/24* (2006.01)
*B64D 43/00* (2006.01)
*H02H 7/08* (2006.01)

(52) U.S. Cl.
CPC ......... *H02H 7/08* (2013.01); *B64D 2027/026* (2013.01)

(56) References Cited

U.S. PATENT DOCUMENTS

2020/0062414 A1* 2/2020 Hon ..................... B64D 31/06
2020/0339268 A1* 10/2020 Mark ..................... B64F 5/60

OTHER PUBLICATIONS

European Patent Office, Communication re. extended European search report for European patent application No. 21174163.2, dated Mar. 30, 2023.

\* cited by examiner

CONTROL SYSTEMS FOR HYBRID ELECTRIC POWER PLANTS

FIELD

This disclosure relates to control systems for hybrid electric powerplants.

BACKGROUND

When determining potential control system architecture concepts for propeller-driven hybrid-electric propulsion systems, there are infinite possibilities to split the functionality between the different control lanes. Challenges arise when considering potential safety and certification ramifications when splitting functionality between different control lanes.

Such conventional methods and systems have generally been considered satisfactory for their intended purpose. However, there is still a need in the art for control systems for hybrid electric powerplants. The present disclosure provides a solution for this need.

SUMMARY

A control system for a hybrid electric powerplant (HEP) of an aircraft can include a throttle controller configured to receive one or more power settings and to output a heat engine setting and an electric motor setting, a heat engine controller operatively connected to the throttle controller. The system can include a heat engine controller configured to receive the heat engine setting and to control a heat engine system as a function of the heat engine setting to control torque output by a heat engine. The system can include a heat engine protection module that is part of or connected to the heat engine controller and configured to provide one or more protection commands to directly control one or more heat engine protection systems.

The system can include an electric motor controller operatively connected to the throttle controller. The electric motor controller can be configured to receive the electric motor engine setting and to control an electric motor system as a function of the electric motor setting to control torque output by an electric motor. The system can include an electric motor protection module that is part of or connected to the electric motor controller and configured to provide one or more protection commands to directly control one or more electric motor protection systems.

The system can include a propeller controller operatively connected to the throttle controller. The throttle controller can be configured to output a propeller setting. The propeller controller can be configured to receive the propeller setting from the throttle controller and to control a propeller control system as a function of the propeller setting. The system can include a propeller system protection module that is part of or connected to the propeller controller and configured to provide one or more protection commands to directly control one or more propeller protection systems.

The throttle controller can be operatively connected to at least one of or each of the electric motor, the heat engine, and/or the propeller system to receive feedback therefrom to provide control thereto. The heat engine protection module can be operatively connected to the heat engine to receive heat engine feedback therefrom to provide protection control for the heat engine. The electric motor protection module can be operatively connected to the electric motor to receive electric motor feedback therefrom to provide protection control for the electric motor. The propeller protection module can be operatively connected to the propeller system to receive propeller system feedback therefrom to provide protection control for the propeller system.

The electric motor system can include a battery management system (BMS). The electric motor protection system can include an electrical cutoff mechanism disposed between the BMS and the electric motor. The electrical cutoff mechanism can be configured to be controlled by the electric motor protection module to cut off electrical energy to the electric motor in a protection state.

In certain embodiments, the heat engine system controlled by the heat engine controller can be a fuel control unit, for example. The heat engine protection system can include a fuel shutoff valve configured to be controlled by the heat engine protection module to cut off fuel flow to the fuel control unit in a protection state.

In certain embodiments, the propeller control system controlled by the propeller controller can be a propeller control unit configured to control a pitch of the propeller. The propeller protection system can include a feathering valve configured to be controlled by the propeller protection module to coarsen the pitch of the propeller in a protection state.

The electric motor controller, the heat engine controller, and the propeller controller and/or the electric motor protection module, the heat engine protection module, and the propeller system protection module can be operatively connected to the electric motor, the heat motor, and the propeller system, respectively, to receive feedback therefrom for controlling the respective system. The electric motor controller, the heat engine controller, and the propeller controller and/or the electric motor protection module, the heat engine protection module, and the propeller system protection module can be operatively connected to the throttle controller to provide controller operation feedback and/or respective system feedback to the throttle controller.

The throttle controller can include a thrust control module configured to divide a thrust command into an electric torque command for use by the electric motor controller and a heat engine torque command for use by the heat engine controller such that the electric engine settings include the electric torque command and the heat engine settings include a heat engine torque command. The throttle controller can include a propeller control module configured to receive a propeller mode setting and to output a propeller setting to achieve a selected propeller operation mode.

In certain embodiments, the throttle controller can be configured to receive feedback from each of the protection modules for detection and/or reporting of a problem with at least one of the heat engine system, the electric motor system, or the propeller system and/or to diagnose a cause and/or resolve the problem by controlling a different system. In certain embodiments, the throttle controller can be configured to output one or more values of the feedback to an aircraft cockpit display.

The heat motor feedback, the electric motor feedback, and/or the propeller system feedback can include a torque value and/or a speed value. The heat engine feedback can include a temperature value for detecting heat engine fire.

In certain embodiments, the throttle controller can be located in the fuselage of the aircraft and the electric motor controller and/or the heat engine controller can be located in the fuselage, wing, or HEP. In certain embodiments, the throttle controller can be disposed within an avionics stack in a cockpit of the aircraft.

In certain embodiments, ambient air data can be input to each of the throttle controller, the heat engine controller, the electric motor controller, and the propeller controller and/or to each of the heat engine protection module, the electric motor protection module, and the propeller system protection module.

In certain embodiments, control information (e.g., power lever angle (PLA) output, condition lever angle (CLA) output, or any other suitable control input, e.g., to the throttle controller) can be input in parallel with the throttle controller to each of the heat engine controller, the electric motor controller, and the propeller controller and/or to each of the heat engine protection module, the electric motor protection module, and the propeller system protection module to provide secondary control input thereto. Any other suitable inputs are contemplated herein.

A method can include controlling an electric motor with an electric motor controller, controlling a heat engine with a heat engine controller, providing an electric motor torque command to the electric motor controller and a heat engine torque command to the heat engine controller using a throttle controller, providing overspeed or overtorque protection to the electric motor and the heat engine with an electric motor protection module and a heat engine protection module separate from the throttle controller, respectively. The method can include controlling a propeller system with a propeller controller, providing a propeller setting command to a propeller controller, and providing propeller system protection using a propeller system protection module separate from the throttle controller. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
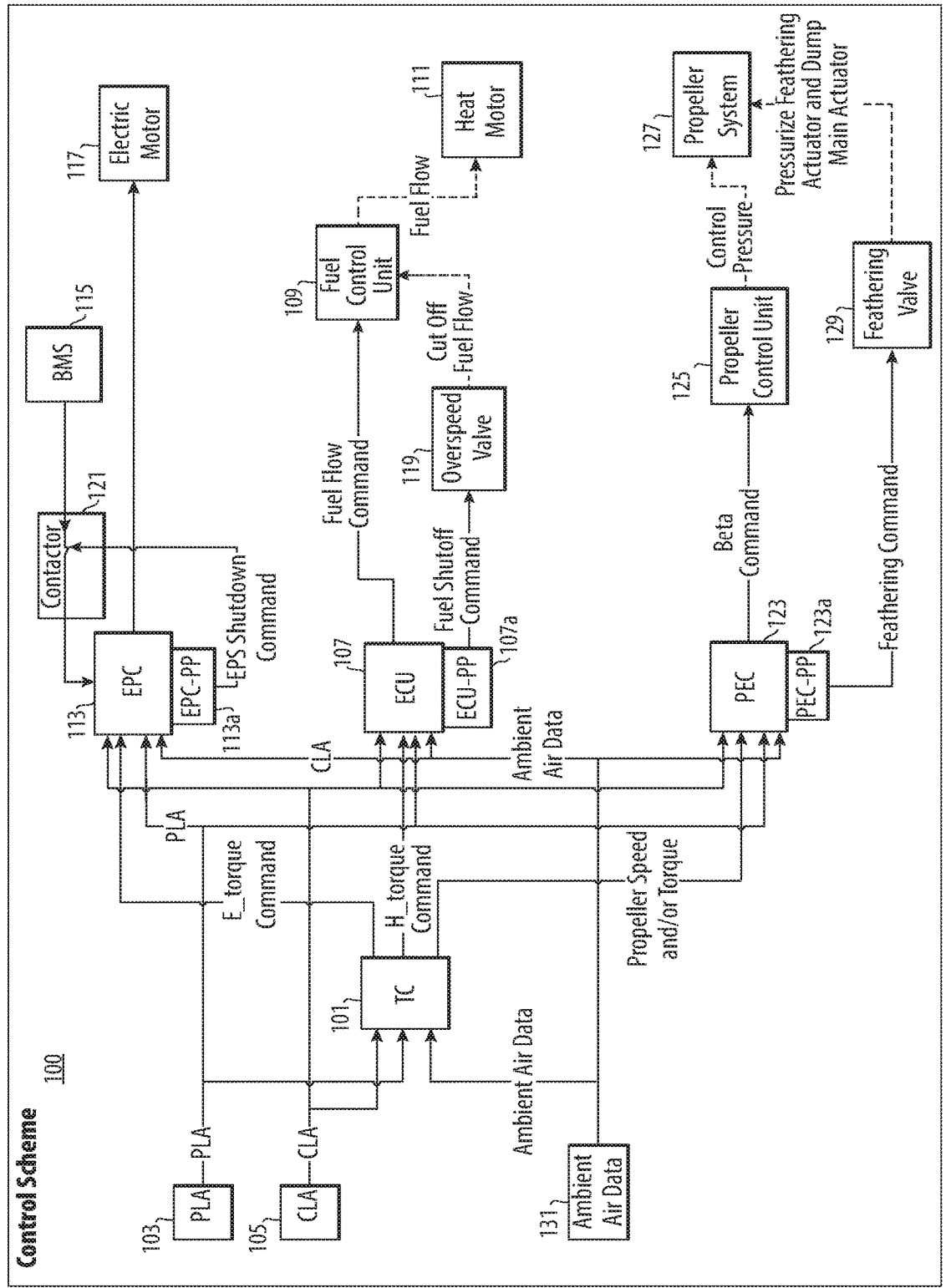
FIG. 1 is a schematic diagram of an embodiment of a control system in accordance with this disclosure, schematically showing input data flow.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2.

Figure 2:
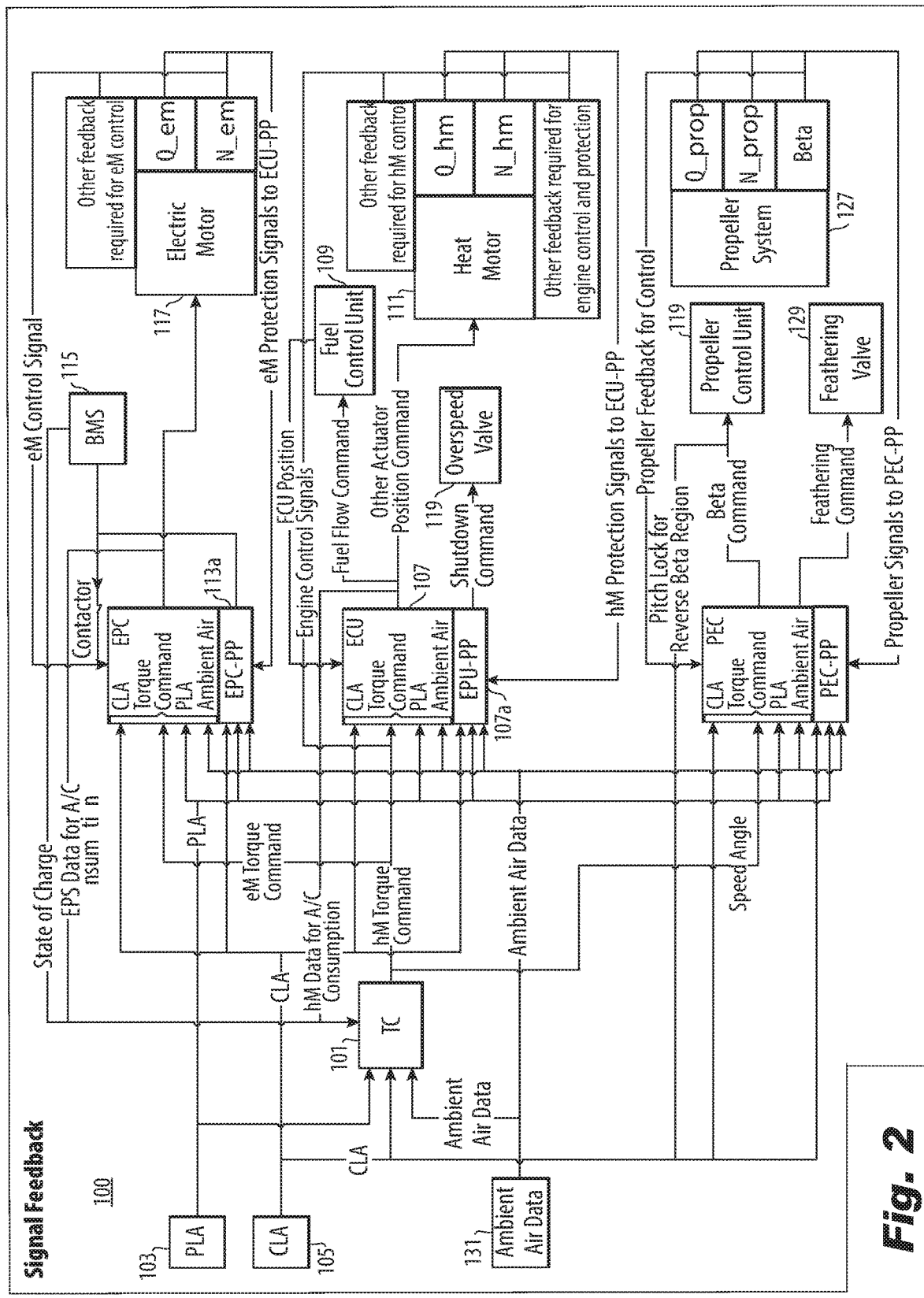
FIG. 2 is a schematic diagram of the embodiment of FIG. 1, additionally showing feedback flow.

Referring to FIGS. 1 and 2, a control system 100 for a hybrid electric powerplant (HEP) of an aircraft can include a throttle controller 101 configured to receive one or more power settings (e.g., throttle and/or propeller setting). For example, the throttle controller 101 can be configured to be operatively connected to a power lever 103 to receive power lever angle (PLA). In certain embodiments, the throttle controller 101 can be operatively connected to a propeller control lever or mode selector 105 to receive a propeller setting (e.g., control lever angle CLA or a mode). The throttle controller 101 can be configured to output a heat engine setting (e.g., a torque command) and an electric motor setting (e.g., a torque command).

The system 100 can include a heat engine controller 107 operatively connected to the throttle controller 101. The heat engine controller 107 can be configured to receive the heat engine setting and to control a heat engine system 109 as a function of the heat engine setting to control torque output by a heat engine 111. The system 100 can include a heat engine protection module 107a that is part of or connected to the heat engine controller 107 and configured to provide one or more protection commands to directly control one or more heat engine protection systems (e.g., an overspeed valve 119). The heat engine protection module 107a can be integrated with and/or independent of the heat engine controller 107 in any suitable manner.

The system 100 can include an electric motor controller 113 operatively connected to the throttle controller 101. The electric motor controller 113 can be configured to receive the electric motor engine setting and to control an electric motor system (e.g., the electric motor 115 and/or battery management system 117) as a function of the electric motor setting to control torque output by an electric motor 117. The system 100 can include an electric motor protection module 113a that is part of or connected to the electric motor controller 113 and configured to provide one or more protection commands to directly control one or more electric motor protection systems (e.g., electrical cut-off switch 121). The electric motor protection module 113a can be integrated with and/or independent of the electric motor controller 107 in any suitable manner.

The system 100 can include a propeller controller 123 operatively connected to the throttle controller 101. The throttle controller 101 can be configured to output a propeller setting (e.g., a propeller speed and/or torque command). The propeller controller 123 can be configured to receive the propeller setting from the throttle controller 101 and to control a propeller control system 123 (e.g., a PCU) as a function of the propeller setting. The propeller control system 125 can control a propeller system 127 to control a pitch of a propeller (e.g., via a hydraulic pitch control as appreciated by those having ordinary skill in the art in view of this disclosure).

The system 100 can include a propeller system protection module 123a that is part of or connected to the propeller controller 123 and configured to provide one or more protection commands to directly control one or more propeller protection systems (e.g., a feathering valve 129). The propeller controller 123 can be a separate unit as shown, or integrated in any other controller or control module (e.g., in the thrust controller 101, in the heat engine controller 107, in the electric motor controller 113).

In certain embodiments, the throttle controller 101 can be operatively connected to at least one of or each of the electric motor 117, the heat engine 111, and/or the propeller system 127, and/or their respective controllers 107, 113, 123 and/or their respective protection modules 107a, 113a, 123a to receive feedback therefrom to provide control thereto. In certain embodiments, the respective controllers 107, 113, 123 and/or their respective protection modules 107a, 113a, 123a can be operatively connected to the electric motor 117, the heat engine 111, and/or the propeller system 127, respectively, to receive feedback therefrom to provide control thereto.

As shown in FIG. 2, for example, the heat engine protection module 107a can be operatively connected to the heat engine 111 to receive heat engine feedback therefrom to provide protection control for the heat engine 111. The electric motor protection module 113a can be operatively connected to the electric motor 111 to receive electric motor feedback therefrom to provide protection control for the electric motor 111. The propeller protection module 123a operatively connected to the propeller system 127 to receive propeller system feedback therefrom to provide protection control for the propeller system 127. The feedback can include a torque value and a speed value, for example (e.g., for determining over torque conditions). Any suitable feedback, e.g., from any suitable sensor, is contemplated herein.

In certain embodiments, the electric motor controller 113, the heat engine controller 107, and the propeller controller 123 can be operatively connected to the throttle controller 101 to provide controller operation feedback and/or respective system feedback to the throttle controller 101. For example, each sub controller can have redundant sensing with the throttle controller 101 and can report sensed values to the throttle controller 101 to compare and determine if the redundant sensors are working properly, and thereby determine if the sub controller is working properly. It is contemplated that any suitable data from each subsystem can be reported to the throttle controller 101, directly and/or indirectly, independently or otherwise (e.g., battery state of charge, heat engine and/or electric motor speed, torque, temperature, etc.).

As disclosed herein, the electric motor controller 113, the heat engine controller 107, and the propeller controller 123 and/or the electric motor protection module 113a, the heat engine protection module 107a, and the propeller system protection module 123a can be operatively connected to the electric motor 117, the heat motor 111, and the propeller system 127, respectively, to receive feedback therefrom for controlling the respective system. The electric motor controller 113, the heat engine controller 107, and the propeller controller 123 and/or the electric motor protection module 113a, the heat engine protection module 107a, and the propeller system protection module 123a can be operatively connected to the throttle controller 101 to provide controller operation feedback and/or respective system feedback to the throttle controller 101.

In certain embodiments, the throttle controller 101 can be configured to receive feedback from each of the protection modules 107a, 113a, 123a for detection and/or reporting of a problem with at least one of the heat engine system, the electric motor system, or the propeller system and/or to diagnose a cause and/or resolve the problem by controlling a different system (e.g., a different power lane). In certain embodiments, the throttle controller 101 can be configured to output one or more values of the feedback to an aircraft cockpit display (e.g., battery state of charge, electric motor torque, heat engine torque, electric motor temperature, heat engine temperature), for example. Any suitable display and any suitable values are contemplated herein.

The electric motor system 117 can include a battery management system (BMS), e.g., as shown. The electric motor protection system can include an electrical cutoff mechanism 121 (e.g., a suitable switch) disposed between the BMS 117 and the electric motor 115. The electrical cutoff mechanism can be configured to be controlled by the electric motor controller 113 and/or the electric motor protection module 113a to cut off electrical energy to the electric motor 115 in a protection state (e.g., when commanded by electric motor controller 113 and/or the electric motor protection module 113a, e.g., due to shaft shearing, overspeeding, overtorque, etc.). Any other suitable protection systems are contemplated herein.

In certain embodiments, the heat engine system controlled by the heat engine controller 107 can be a fuel control unit 109, for example. The heat engine protection system can include a fuel shutoff valve 119 (e.g., an overspeed shutoff valve) configured to be controlled by the heat engine protection module 107a to cut off fuel flow to the fuel control unit 109 in a protection state. Any other suitable protection systems are contemplated herein. In certain embodiments, the fuel shutoff valve 119 can be activated when the speed goes above a steady state threshold (e.g., over 105%) or engine behavior threshold (e.g., transient behavior like that seen during shaft shear), at which point the heat engine protection module 107a can conclude that the heat engine controller 107 has lost control of the heat engine 111 and shut down the heat engine 111.

In certain embodiments, the propeller control system 125 controlled by the propeller controller 123 can be a propeller control unit (PCU) 125 (e.g., a hydraulic pressure system, an electric system such as motor/screw-jack system, or any other suitable system) configured to control a pitch of the propeller. The propeller protection module 123a can include a feathering valve 129 configured to be controlled by the propeller protection module 123a to coarsen the pitch of (e.g., feather) the propeller in a protection state (e.g., when commanded by the propeller protection module 123a due to an engine failure or shaft shear). Any other suitable protection systems are contemplated herein. In certain embodiments, as a diagnostic and/or less drastic response, the propeller protection module 123a may see an overspeed threshold/transient threshold reached, and can coarsen the propeller pitch to attempt to control the overspeed first before shutting down the heat motor 111 by actuating the fuel shutoff valve. This can allow the system 100 to try to correct a fixable heat engine issue without immediately shutting down due overspeed (e.g., for a direct drive system where the heat engine is directly coupled to the propeller system). The system 100 can include a pitch lock (e.g., as appreciated by those having ordinary skill in the art) to prevent reverse thrust at the wrong time.

The thrust controller 101 can include a thrust control module configured to divide a thrust command (e.g., from a power lever) into an electric torque command for use by the electric motor controller 113 and a heat engine torque command for use by the heat engine controller 107. In this regard, the electric engine settings can include the electric torque command and the heat engine settings include a heat engine torque command. In certain embodiments, the electric motor, heat motor, and propeller can also be controlled by speed in addition to or separate from torque, and the thrust control module can output a speed command. Any other suitable engine and motor control scheme is contemplated herein.

The throttle controller 101 can include a propeller control module configured to receive a propeller mode setting (e.g., from a mode selector instead of CLA 105) and to output a propeller setting to achieve a selected propeller operation mode (e.g., quite mode, efficient mode, cruise mode, etc.). In certain embodiments, this can reduce the thrust controls to one cockpit lever, for example. Any other suitable propeller control scheme is contemplated herein.

The heat motor feedback, the electric motor feedback, and/or the propeller system feedback can include a torque value and/or a speed value. In certain embodiments, the feedback can include a temperature value for detecting heat engine fire. For example, a heat engine fire can be detected by a temperature sensor of the electric motor if the heat engine 111 is mounted in thermal communication (e.g., in the same fire zone) as the electric motor 117.

In certain embodiments, the throttle controller can be located in the fuselage of the aircraft and the electric motor controller and/or the heat engine controller can be located in the fuselage, wing, or HEP. In certain embodiments, the throttle controller can be disposed within an avionics stack in a cockpit of the aircraft. Any suitable locations are contemplated herein.

In certain embodiments, ambient air data (e.g., from an air data sensor 131) can be input to each of the throttle controller 101, the heat engine controller 107, the electric motor controller 113, and/or the propeller controller 123 (e.g., if a beta command is not provided) and/or to each of the heat engine protection module 107a, the electric motor protection module 113a, and the propeller system protection module 123a, and/or to any other suitable system. Each controller can utilize one or more portions or all of the ambient air data to control the respective system as a function of the ambient air data.

In certain embodiments, control information (e.g., power lever angle (PLA) output, condition lever angle (CLA) output, or any other suitable control input, e.g., to the throttle controller 101) can be input in parallel with the throttle controller 101 to each of the heat engine controller 107, the electric motor controller 113, and the propeller controller 123 and/or to each of the heat engine protection module 107a, the electric motor protection module 113a, and the propeller system protection module 123a to provide secondary control input thereto (e.g., in the event of thrust controller 101 failure or a manual override). Each controller can be configured to utilize the secondary control input in any suitable manner (e.g., to produce a torque split based on any suitable map, algorithm, manual control, etc.). Any other suitable inputs are contemplated herein.

In accordance with at least one aspect of this disclosure, a method can include controlling an electric motor with an electric motor controller, controlling a heat engine with a heat engine controller, providing an electric motor torque command to the electric motor controller and a heat engine torque command to the heat engine controller using a throttle controller, providing overspeed or overtorque protection to the electric motor and the heat engine with an electric motor protection module and a heat engine protection module separate from the throttle controller, respectively. The method can include controlling a propeller system with a propeller controller, providing a propeller setting command to a propeller controller, and providing propeller system protection using a propeller system protection module separate from the throttle controller. The method can include any other suitable method(s) and/or portion(s) thereof.

Embodiments can decentralize protection functions from the thrust controller 101, for example. In certain embodiments, the thrust controller 101 may only perform torque splitting and send torque values and/or other suitable control commands to other sub controllers. The other sub controllers can be configured to handle all the protection functions.

Embodiments can include independent protection systems necessary to mitigate, prevent, or control potential safety conditions. Certain embodiments can have two pilot inputs, e.g., Power Lever Angle (PLA) and Condition Lever Angle (CLA), for power command and speed command, respectively, throttle controller as a primary command receiver, secondary power and command signals to electric motor controller and the heat engine controller, separate propeller control from engine control, and no mechanical disconnect for any power source.

The throttle controller (e.g., throttle control unit (TC)) can be the power command controller of the hybrid-electric propulsion (HEP) system 100 which includes an electric motor, heat motor, and a propeller system. The TC can receive the pilot thrust/power command in the form of PLA signal, the pilot commanded propeller speed in the form of the CLA signal, and the ambient air conditions from the aircraft systems. The TC can use the aircraft signals to determine the power demand for the total HEP system and splits the demand into power commands to controllers for the electric motor (eM), heat motor (hM), and propeller system. The speed governing of the HEP could be performed by the propeller control system or the hM control system, for example. The TC can calculate the optimum the power output from the heat motor and electric motor with the propeller system.

In certain embodiments, upon receiving aircraft data, the TC can translate the power command, ambient air conditions, and propeller speed command to determine the propeller blade angle (beta) and the power split between the hM and eM. Ambient air conditions can affect the thrust generated by the propeller and the hM performance. The TC can have performance maps and models of the propeller and hM performance to determine the optimum motor and propeller operating points to meet the thrust command with the given propeller speed.

The TC can send commands to the heat engine controller (e.g., an Engine Control Unit (ECU)) for the torque required from the hM (Q_hm). The electric motor controller (e.g., an Electric Powertrain Controller (EPC)) can receive a power command (Q_eM) from the TC, and the speed control can be performed by either the propeller system controller 123 (e.g., a Propeller Electronic Controller (PEC)) and/or the heat engine control unit (e.g., the ECU). The TC may also relay any relevant A/C provided data such as bleed air demand and accessories servicing demand (e.g. electrical power, hydraulic power, etc.), for example. With the power (and potentially speed) input, the hM control system can govern their own functions independent of the other control subsystems. All downstream controllers (e.g., EPC, ECU, and PEC) can have PLA and CLA vs. Power and speed maps located in their local memory, for example. This local map can be used for comparison and fault accommodation purposes, for example, so that secondary inputs of PLA and CLA can be used by the controllers to output a power even in the TC fails or in the event of a pilot override.

The TC can calculate the power split and send the commands to each control sub-system to create the optimized performance. Each sub-system can also receive PLA and CLA commands independent of the TC, for example which can provide the option for a pilot override, for example. In certain embodiments, if the PLA and CLA command differ significantly from the torque and speed commands coming from the TC, for example, each controller can use the PLA and CLA signal coming from the aircraft which can allow safety override functions for the pilots. In embodiments, with each subsystem controller being able to determine the fault status of its subsystem and take control based on information independent of the TC, it allows independent measures to prevent the TC from causing severe safety issues. Pilot intervention or cross-controller communication can mitigate any TC fault leading to inadvertent reduced power, increased power, propeller overspeed, or propeller reverse operation, for example.

The TC can also send the blade angle (beta) command to the propeller system controller (e.g., the Propeller Engine Controller (PEC)). The PEC can send the beta command to the Propeller Control Unit (PCU) which can translate the command into an oil pressure to coarsen or reduce the blade angle, for example.

In certain embodiments, each subsystem would contain its own safety functions and features and the TC would not provide any independent safety features for any of the torque or speed controls. In certain embodiments, the overall HEP control system would contain protection functions to protect against the following safety cases as shown in Table 1.

TABLE 1

| Safety Case | Protection Functions | | |
|---|---|---|---|
| | hM Control | EPT Control | Propeller Control |
| Propeller overspeed | X | X | X |
| Propeller overtorque | X | X | X |
| Inadvertent reverse thrust/power | X | X | X |
| In-Flight Shutdown and Inability to Autofeather | X | X | X |
| Engine overspeed | X | X | |
| Engine shaft shear | X | | |
| Uncontrollable high thrust (UHT) | X | X | X |

All parameters affecting a control and protection function (e.g. speed, torque, propeller blade angle, etc.) can have completely independent means of measurement (e.g. multiple probes or segregated means of measurement) for regulatory reasons. For parameters from aircraft systems, similar means to ensure that no single failure can result in a Catastrophic or Hazardous safety case can be implemented.

In certain embodiments, an Engine Control Unit Protection Processor (ECU-PP) can have control over the overspeed valve (OSV). The OSV can provide a fuel shutoff means upstream of the fuel control unit (FCU) and can be used to shutdown the hM when required. In certain embodiments, a Propeller Electronic Controller Protection Processor (PEC-PP) or Overspeed Governor (OSG) can have control over a feathering valve, for example. The feathering valve can have the authority to coarsen the blade angle to "grab more air" to push the propeller out of certain critical operating areas. In certain embodiments, an Electric Powertrain Controller Protection Processor (EPC-PP) can have control over the battery contactor. The battery contactor can remove current and voltage upstream of the Electric Powertrain Controller (EPC) and e-Motor. Any combination of these devices is contemplated herein.

Certification Authority (e.g. FAA, EASA, TCCA, etc.) regulations and certification requirements can drive a need for certain protection means to protect against hM failure cases resulting in "engine" and aircraft level safety cases. In the event of an initiating event with the potential to lead to a Hazardous or Catastrophic event, the ECU-PP can cut off fuel flow using the OSV in certain embodiments. Heat motor protection functions may include protection against "Non-containment of high-energy debris," shaft shear protection, overspeed protection, and/or protection against Uncontrollable High Thrust, for example.

For the propeller system, Certification Authority regulations and certification requirements can drive the need for independent protection means for the propeller system. The protection means for propeller systems depends on the potential hazard being mitigated. In the event of an in-flight shutdown (IFSD), the propeller may be feathered to reduce the drag. Inability to feather after an IFSD on takeoff or climb can be detrimental to performance. Protection means against a propeller overspeed and potential blade separation can also be provided by driving the propeller blade angle towards feather, i.e., coarsening the blade. By coarsening the blade angle, the propeller "grabs" more air and slows down as the rotational energy is transferred to torque.

The TC can receive all pertinent data from the ECU, EPC, and BMS, for example. The TC can transmit all HEP data to the aircraft systems or each controller could interact with the avionics independent of the TC in certain embodiments. Parameters provided to the aircraft can include battery state of charge, speed (e.g., propeller and/or engine), torque, motor temperature, oil temperature and pressure, and coolant temperature and pressure, for example.

In accordance with embodiments disclosed hereinabove, the use of the TC upstream of the propeller, eM, and hM control systems can allow a simplified control structure for the downstream controllers. Each controller can take its torque and speed input and control the subsystem without requiring input from the other controllers. This can alleviate the need for one of the controllers to be a throttle controller and integration considerations to accommodate the controllers downstream of the master. The use of an upstream controller (e.g., the thrust controller) can increase the robustness and reliability such that the HEP power management system can be tolerant to failures of both upstream and downstream controllers. If the TC is faulted, each controller can revert to the local PLA and CLA vs. speed and power map. If one of the downstream controllers is faulted and fails to provide commanded power, the TC can detect the fault, assess the operating conditions, and command the required power from the remaining power lane, as required, for example.

With the PLA and CLA commands being provided to the controllers, there are multiple benefits to the safety of the HEP control system. Each controller can determine if there is a fault in the TC by comparing it to expected torque and speed commands from the TC, for example. If the TC-provided command is outside of a suitable range, then the respective controllers can flag a fault and/or override the TC. The allowance for pilot override reduces the safety criticality for the TC. Many system design complexities and safety considerations can be mitigated by allowing the pilot control to override the torque split/torque conditioning calculation.

Any controllers and/or modules described above can include any suitable hardware module(s) and/or software module(s). Any suitable controllers and/or modules can be independent of each other or can be hosted together and/or integrated together in any suitable manner (e.g., various software modules hosted on the same computer hardware).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A control system for a hybrid electric powerplant of an aircraft, comprising:
    a throttle controller configured to receive one or more power command settings and to output a heat engine setting and an electric motor setting;
    a heat engine controller operatively connected to the throttle controller, the heat engine controller configured to receive the heat engine setting and to control a heat engine system as a function of the heat engine setting to control torque output by a heat engine;
    a heat engine protection module that is part of or connected to the heat engine controller and configured to provide one or more protection commands to directly control one or more heat engine protection systems;
    an electric motor controller operatively connected to the throttle controller, the electric motor controller configured to receive the electric motor engine setting and to control an electric motor system as a function of the electric motor setting to control torque output by an electric motor;
    an electric motor protection module that is part of or connected to the electric motor controller and configured to provide one or more protection commands to directly control one or more electric motor protection systems;
    a propeller controller operatively connected to the throttle controller, wherein the throttle controller is configured to output a propeller setting, the propeller controller configured to receive the propeller setting from the throttle controller and to control a propeller control system as a function of the propeller setting; and
    a propeller system protection module that is part of or connected to the propeller controller and configured to provide one or more protection commands to directly control one or more propeller protection systems,
    wherein the throttle controller is operatively connected to at least one of or each of the electric motor, the heat engine, and/or the propeller system to receive feedback therefrom to provide control thereto, wherein the heat engine protection module is operatively connected to the heat engine to receive heat engine feedback therefrom to provide protection control for the heat engine, wherein the electric motor protection module is operatively connected to the electric motor to receive electric motor feedback therefrom to provide protection control for the electric motor, and wherein the propeller protection module is operatively connected to the propeller system to receive propeller system feedback therefrom to provide protection control for the propeller system,
    wherein the electric motor system includes a battery management system (BMS), wherein the electric motor protection system includes an electrical cutoff mechanism disposed between the BMS and the electric motor, the electrical cutoff mechanism being configured to be controlled by the electric motor protection module to cut off electrical energy to the electric motor in a protection state,
    wherein the heat engine system is a fuel control unit, wherein the heat engine protection system includes a fuel shutoff valve configured to be controlled by the heat engine protection module to cut off fuel flow to the fuel control unit in a protection state,
    wherein the heat engine controller, the electric motor controller and the propeller controller are each configured to:
    receive the one or more power command settings independently of the throttle controller; and
    flag a fault with the throttle controller and/or override the throttle controller.

2. The system of claim 1, wherein the propeller control system is a propeller control unit configured to control a pitch of the propeller, wherein the propeller protection system includes a feathering valve configured to be controlled by the propeller protection module to coarsen the pitch of the propeller in a protection state.

3. The system of claim 1, wherein the electric motor controller, the heat engine controller, and the propeller controller and/or the electric motor protection module, the heat engine protection module, and the propeller system protection module are operatively connected to the electric motor, the heat engine, and the propeller system, respectively, to receive feedback therefrom for controlling the respective system.

4. The system of claim 3, wherein the electric motor controller, the heat engine controller, and the propeller controller and/or the electric motor protection module, the heat engine protection module, and the propeller system protection module are operatively connected to the throttle controller to provide controller operation feedback and/or respective system feedback to the throttle controller.

5. The system of claim 1, wherein the throttle controller includes a thrust control module configured to divide a thrust command into an electric torque command for use by the electric motor controller and a heat engine torque command for use by the heat engine controller such that the electric engine settings include the electric torque command and the heat engine settings include a heat engine torque command.

6. The system of claim 5, wherein the throttle controller includes a propeller control module configured to receive a propeller mode setting and to output a propeller setting to achieve the selected propeller operation mode.

7. The system of claim 1, wherein the throttle controller is configured to receive feedback from each of the protection modules for detection and/or reporting of a problem with at least one of the heat engine system, the electric motor system, or the propeller system and/or to diagnose a cause and/or resolve the problem by controlling a different system.

8. The system of claim 1, wherein the heat engine feedback, the electric motor feedback, and/or the propeller system feedback includes a torque value and/or a speed value.

9. The system of claim 8, wherein the heat engine feedback includes a temperature value for detecting heat engine fire.

10. The system of claim 1, wherein the throttle controller is configured to output one or more values of the feedback to an aircraft cockpit display.

11. The system of claim 10, wherein the throttle controller is located in the fuselage of the aircraft, wherein the electric motor controller and/or the heat engine controller are located in the fuselage, wing, or hybrid-electric powerplant (HEP).

12. The system of claim 11, wherein the throttle controller is disposed within an avionics stack in a cockpit of the aircraft.

13. The system of claim 1, wherein ambient air data is input to each of the throttle controller, the heat engine controller, the electric motor controller, and the propeller controller and/or to each of the heat engine protection module, the electric motor protection module, and the propeller system protection module.

14. The system of claim 1, wherein control information is input in parallel with the throttle controller to each of the heat engine controller, the electric motor controller, and the propeller controller and/or to each of the heat engine protection module, the electric motor protection module, and the propeller system protection module to provide secondary control input thereto.

15. A method of operating a hybrid aircraft power plant including an electric motor and a heat engine, the method comprising:

controlling an electric motor with an electric motor controller;

controlling a heat engine with a heat engine controller;

receiving one or more power command settings at a throttle controller and determining an electric motor torque command and a heat engine torque command at the throttle controller;

providing the electric motor torque command to the electric motor controller and the heat engine torque command to the heat engine controller;

providing overspeed or overtorque protection to the electric motor and the heat engine with an electric motor protection module and a heat engine protection module separate from the throttle controller, respectively;

controlling a propeller system with a propeller controller;

providing a propeller setting command to a propeller controller;

providing propeller system protection using a propeller system protection module separate from the throttle controller;

receiving the one or more power command settings at the electric motor controller and at the heat engine controller;

using the one or more power command settings at the electric motor controller and at the heat engine controller to determine that there is a fault with the throttle controller; and using the one or more power command settings at the electric motor controller and at the heat engine controller to control the electric motor and the heat engine respectively.

* * * * *